US012794281B2

(12) United States Patent
Mo et al.

(10) Patent No.: US 12,794,281 B2

(45) Date of Patent: Nov. 10, 2026

(54) STRIP STATOR CORE, STATOR ASSEMBLY COMPRISING THE STRIP STATOR CORE, AND MOTOR COMPRISING THE STATOR ASSEMBLY

(71) Applicant: Zhongshan Broad-Ocean Motor Co., Ltd., Zhongshan (CN)

(72) Inventors: Hongwei Mo, Zhongshan (CN); Mingpan Pan, Zhongshan (CN); Xu Zhao, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 205 days.

(21) Appl. No.: 18/739,254

(22) Filed: Jun. 10, 2024

(65) Prior Publication Data

US 2024/0333047 A1 Oct. 3, 2024

Related U.S. Application Data

(63) Continuation-in-part of application No. PCT/CN2022/079845, filed on Mar. 9, 2022.

(30) Foreign Application Priority Data

Dec. 22, 2021 (CN) ......................... 202123251531.2

(51) Int. Cl.
*H02K 1/14* (2006.01)

(52) U.S. Cl.
CPC .................................... *H02K 1/146* (2013.01)

(58) Field of Classification Search
CPC ................................ H02K 1/14; H02K 1/146
USPC .................................................... 310/216.008
See application file for complete search history.

(56) References Cited

U.S. PATENT DOCUMENTS

| | | | | |
|---|---|---|---|---|
| 11,750,064 B2 * | 9/2023 | Inuzuka | H02K 3/522 310/49.33 |
| 12,640,602 B2 * | 5/2026 | Yamamoto | H02K 1/148 |
| 2007/0024149 A1 * | 2/2007 | Nagata | H02K 1/148 310/216.063 |
| 2010/0141059 A1 * | 6/2010 | Nishimura | H02K 1/02 310/44 |
| 2012/0080976 A1 * | 4/2012 | Oka | H02K 3/522 310/215 |
| 2014/0035428 A1 * | 2/2014 | Yuya | H02K 3/522 310/216.057 |
| 2021/0203196 A1 * | 7/2021 | Nigo | H02K 3/345 |
| 2022/0200390 A1 * | 6/2022 | Hirosawa | F04B 35/04 |
| 2024/0333047 A1 * | 10/2024 | Mo | H02K 1/18 |

FOREIGN PATENT DOCUMENTS

| | | |
|---|---|---|
| CN | 101202488 A | 6/2008 |
| CN | 103427529 A | 12/2013 |
| CN | 203607936 U | 5/2014 |

(Continued)

*Primary Examiner* — Rashad H Johnson

(74) *Attorney, Agent, or Firm* — MATTHIAS SCHOLL P.C.; Matthias Scholl

(57) ABSTRACT

A strip stator core, including: a plurality of interconnected stator core units. Each of the plurality of stator core units includes a yoke and a tooth part protruding from an inner side or an outer side of the yoke. The tooth part includes an outer surface partially or completely covered with an electrophoretic protective film and the yokes of the plurality of interconnected stator core units are coiled to form a ring.

9 Claims, 5 Drawing Sheets

(56) References Cited

FOREIGN PATENT DOCUMENTS

| | | | |
|---|---|---|---|
| CN | 204304635 | U | 4/2015 |
| CN | 206481120 | U | 9/2017 |
| JP | 2011223759 | A | 11/2011 |
| JP | 2013223281 | A | 10/2013 |

* cited by examiner

STRIP STATOR CORE, STATOR ASSEMBLY COMPRISING THE STRIP STATOR CORE, AND MOTOR COMPRISING THE STATOR ASSEMBLY

CROSS-REFERENCE TO RELATED APPLICATIONS

This application is a continuation-in-part of International Patent Application No. PCT/CN2022/079845 with an international filing date of Mar. 9, 2022, designating the United States, now pending, further claims foreign priority benefits to Chinese Patent Application No. 202123251531.2 filed Dec. 22, 2021. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a strip stator core, a stator assembly comprising the strip stator core, and a motor comprising the stator assembly.

To save manufacturing costs, improve winding efficiency, and meet the requirements of higher slot filling rate, strip stator cores are generally adopted for motor design and manufacturing. When using strip stator cores to manufacture motors, the strip stator cores are rolled, electrophoretically coated and processed into circular stator cores. The strip stator core includes a plurality of interconnected stator core units 1A. The outer surfaces of all the interconnected stator core units 1A are fully covered with an electrophoretic protective film 2A, which can better protect the stator core. However, after winding the strip stator core into a circular stator core, it is found that the roundness of the circular stator core is not up to the standard. The stator core is difficult to close, and the inner and outer diameters of the annular stator core also exceed the design requirements. After testing and comparison, it is found that the important dimensions of the circular stator core obtained by rolling the same structured strip stator core without electrophoretic coating meet the design requirements. The testing results can be seen in Table 1. Table 1 shows the comparison of the dimensions of the circular stator core obtained by electrophoretic rolling and without electrophoretic rolling of a certain stator core.

TABLE 1

Measured dimensions of a stator core (unit: mm)

| No. | Inner diameter (86 ± 0.02) Electrophoresis | Inner diameter (86 ± 0.02) No electrophoresis | Cylindricity of inner circle (0.05) Electrophoresis | Cylindricity of inner circle (0.05) No electrophoresis | Outer diameter ($140_0^{+0.04}$) Electrophoresis | Outer diameter ($140_0^{+0.04}$) No electrophoresis | Cylindricity of outer circle (0.05) Electrophoresis | Cylindricity of outer circle (0.05) No electrophoresis | Concentricity (0.05) Electrophoresis | Concentricity (0.05) No electrophoresis |
|---|---|---|---|---|---|---|---|---|---|---|
| 1 | 86.086 | 85.984 | 0.128 | 0.055 | 140.119 | 140.001 | 0.011 | 0.053 | 0.144 | 0.037 |
| 2 | 86.113 | 85.990 | 0.133 | 0.007 | 140.183 | 140.021 | 0.139 | 0.018 | 0.017 | 0.032 |
| 3 | 86.111 | 85.987 | 0.250 | 0.053 | 140.325 | 140.003 | 0.238 | 0.052 | 0.051 | 0.016 |
| 4 | 86.104 | 85.998 | 0.125 | 0.037 | 140.174 | 140.025 | 0.148 | 0.040 | 0.040 | 0.038 |
| Average | 86.104 | 85.989 | 0.159 | 0.038 | 140.200 | 140.013 | 0.134 | 0.041 | 0.063 | 0.031 |
| Assessment | Disqualified | Qualified | Disqualified | Qualified | Disqualified | Qualified | Disqualified | Qualified | Disqualified | Qualified |

In the process of manufacturing iron cores, the end face of the iron core needs to be coated to protect the iron core. Many factories adopt manual spraying, but this method had high labor intensity, poor working environment, and low production efficiency. With technological innovation, electrophoretic coating processes are used for the surface coating of the iron core, which can greatly improve work efficiency and working environment. At present, cathodic electrophoretic coating technology is commonly used for motor stator and rotor cores, that is, immersing conductive coated materials in a certain concentration of cathodic electrophoretic coating tank as the cathode, and placing a corresponding anode in the tank. A certain amount of direct current is applied between the cathode and the anode, so that a uniform and water insoluble coating film forms on the coated materials. Electrophoretic coating is widely used for coating processing on the surface of motor stator and rotor cores due to its advantages of high efficiency, high quality (uniform and flat appearance of paint film, no abnormalities, etc.), and safety.

Based on the above descriptions, the outer surfaces of the interconnected stator core units 1A are fully covered with electrophoretic protection film 2A, that is, the electrophoretic protection film 2A is fully coated on the yoke 11A and tooth 12A of each stator core unit 1A. As shown in FIGS. 1 and 2, during the rolling process, the side edges of the yokes 11A of adjacent stator core units 1A will overlap. However, due to the electrophoretic protection film 2A being fully covered on the yokes 11A of the stator core units 1A, the original size of the yokes 11A is increased, resulting in an increase in the machining error of the yokes 11A. When the strip stator core is wound up, the connection of the yokes 11A will cause error superposition, leading to the size deviation after the strip stator core is wound up, resulting in low qualification rate and high scrap rate in manufacturing the stator core, thereby increasing the manufacturing cost of the electric machine.

The dashed line in FIG. 2 represents the external dimensions of the strip stator core after electrophoretic coating, while the solid line in FIG. 2 represents the external dimensions of the strip stator core before electrophoretic coating.

SUMMARY

The disclosure provides a strip stator core, comprising: a plurality of interconnected stator core units, each of the plurality of stator core units comprising a yoke and a tooth part protruding from an inner side or an outer side of the yoke. The tooth part comprises an outer surface partially or completely covered with an electrophoretic protective film and yokes of the plurality of interconnected stator core units are coiled to form a ring.

In a class of this embodiment, the tooth part comprises a crown and a root; and the crown and a part of the root connected to the crown are coated with the electrophoretic protective film.

In a class of this embodiment, a boundary line L between the electrophoretic protective film and the root is a middle line of the root.

In a class of this embodiment, each of the plurality of stator core units comprises a plurality of silicon steel laminates.

In a class of this embodiment, two yokes of every two adjacent stator core units are connected through a connecting bar; and the connecting bar is located on one end of the yoke away from the tooth part.

In a class of this embodiment, a first groove is disposed on a first side of the connecting bar and between two yokes of two adjacent stator core units; a second groove is disposed on a second side of the connecting bar and between the two yokes of the two adjacent stator core units; and the first groove and the second groove are both arc-shaped.

In a class of this embodiment, the yoke of a head of the plurality of stator core units comprises a male buckle, the yoke of a tail of the plurality of stator core units comprises a female buckle matched with the male buckle.

In a class of this embodiment, the yoke of a part of the plurality of stator core units comprises a screw hole.

In another aspect, the disclosure provides a stator assembly, comprising an end insulation, a coil winding, and the above-mentioned strip stator core.

Still, the disclosure provides a motor, comprising the above-mentioned stator assembly, a rotor assembly, and a housing.

The following advantages are associated with the strip stator core of the disclosure.

The outer surface of the tooth part of the stator core units is covered with a layer of electrophoretic protective film, while the yoke of the stator core units is not covered with the electrophoretic protective film, so that the external dimensions of the yoke of the stator core units are not changed. This can effectively prevent the size deviation of the annular stator core after the strip stator core is rolled, effectively improve the qualification rate of the stator core, reduce the material scrap rate, and thus reduce the manufacturing cost of the motor.

DETAILED DESCRIPTION

To further illustrate the disclosure, embodiments detailing a strip stator core are described below. It should be noted that the following embodiments are intended to describe and not to limit the disclosure.

Figure 1:
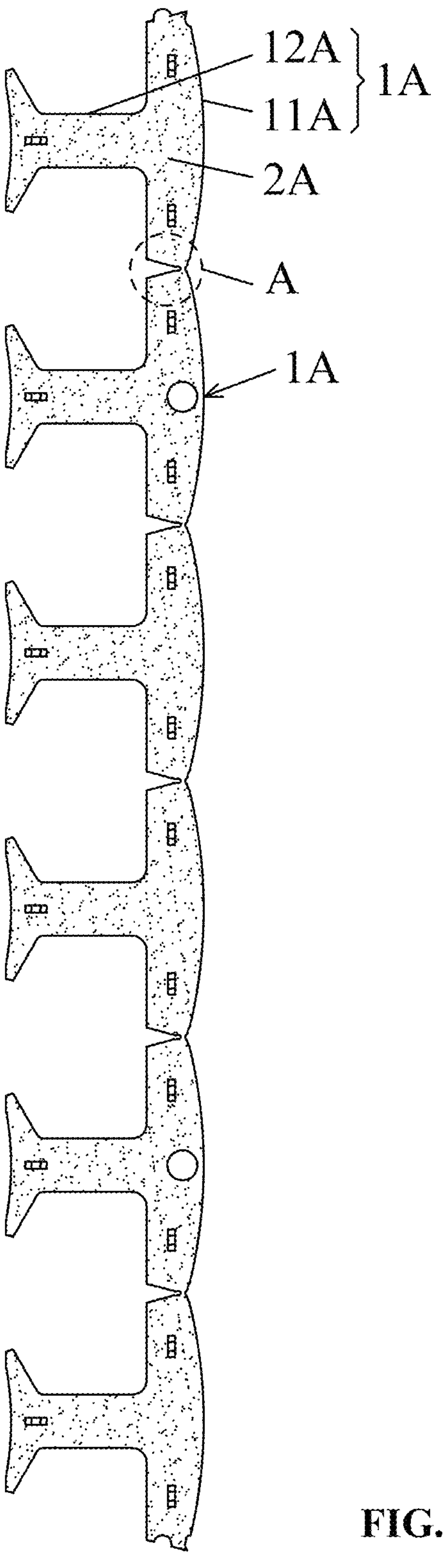
FIG. 1 (Prior art)
FIG. 1 is a schematic diagram of a strip stator core in related art.
Figure 2:
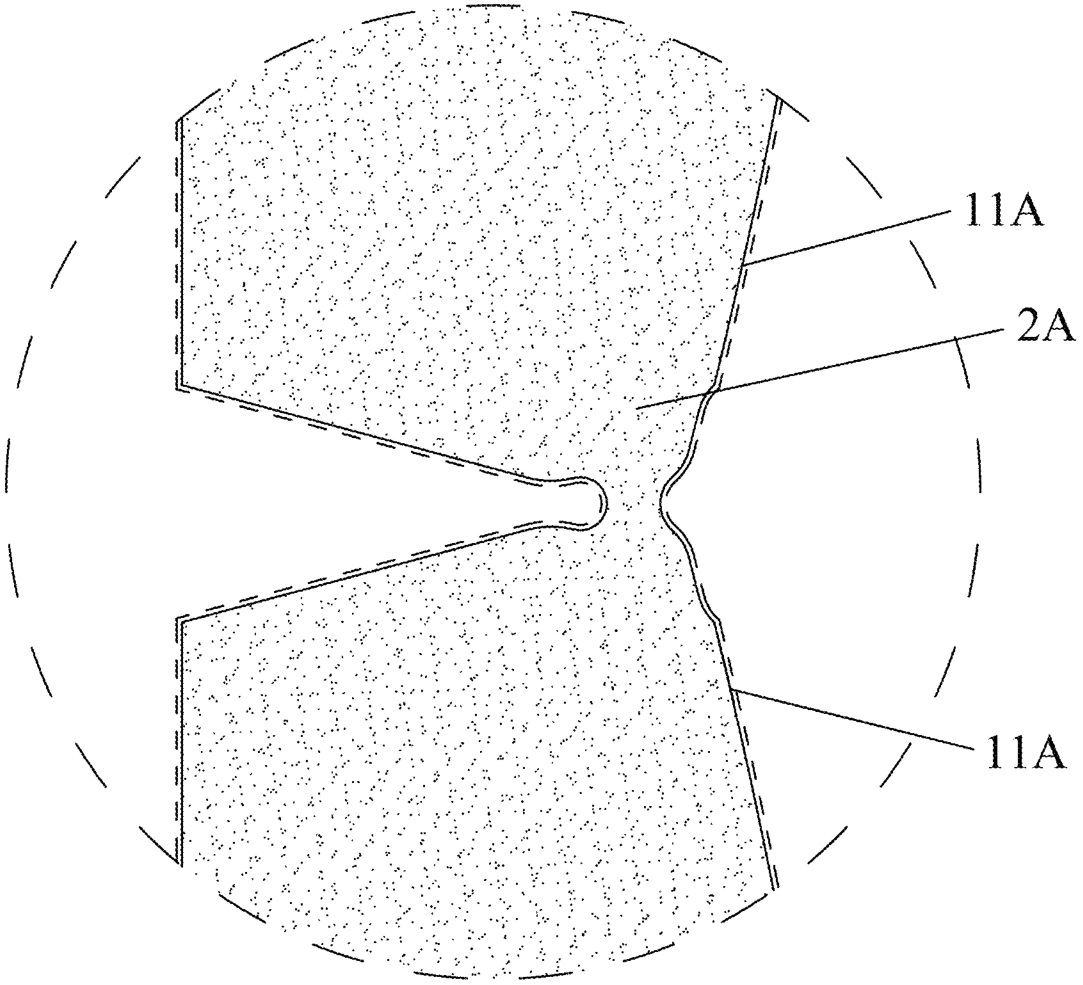
FIG. 2 (Prior art)
FIG. 2 is a local enlarged view of part A in FIG. 1.
Figure 3:
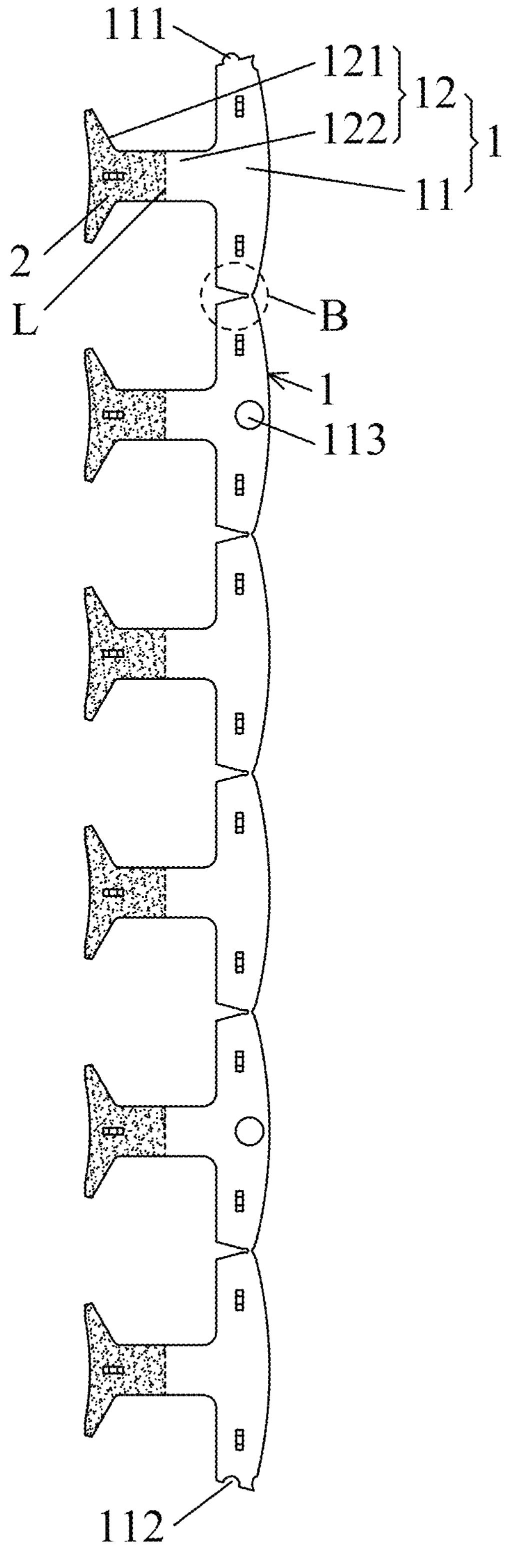
FIG. 3 is a schematic diagram of a strip stator core in one embodiment of the disclosure.
Figure 4:
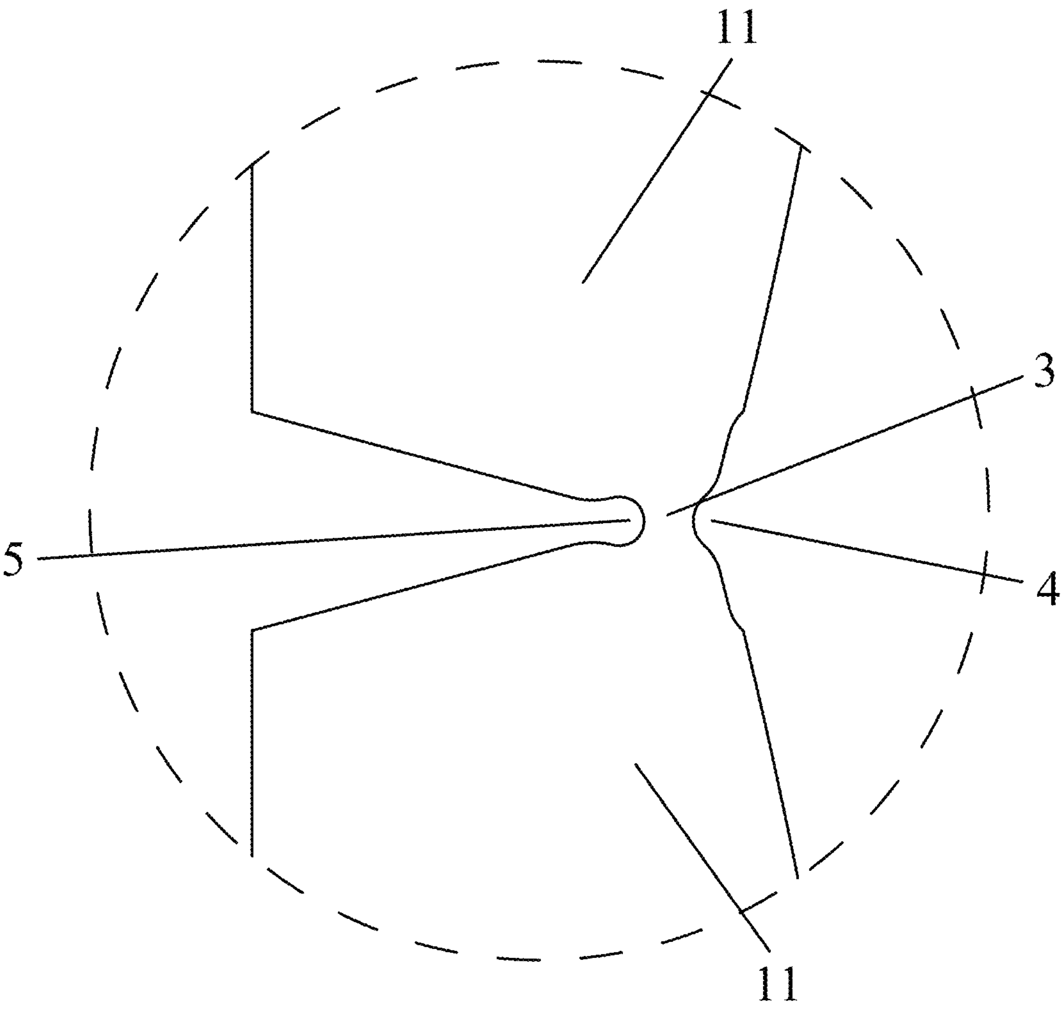
FIG. 4 is a local enlarged view of part B in FIG. 3.
Figure 5:
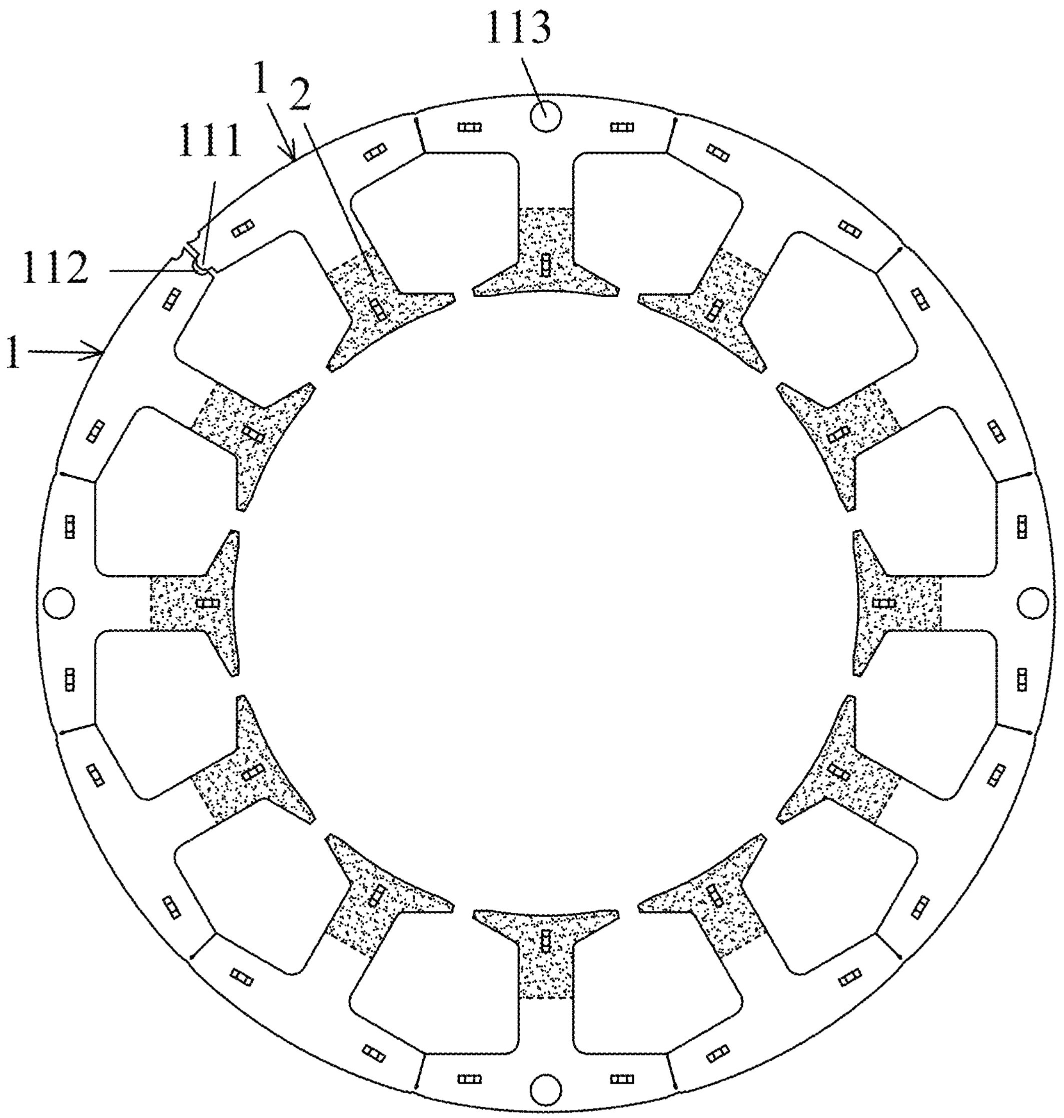
FIG. 5 is a schematic diagram of a strip stator core in one embodiment of the disclosure in an encircled state.

As shown in FIGS. 3-5, the disclosure provides a strip stator core, comprising: a plurality of interconnected stator core units 1; each of the plurality of stator core units comprises a yoke 11 and a tooth part 12 protruding from the inner side or the outer side of the yoke 11. The tooth part 12 comprises an outer surface partially or completely covered with an electrophoretic protective film 2 and the yokes 11 of the plurality of interconnected stator core units 1 are coiled to form a ring. The outer surface of the tooth part 12 of the stator core units 1 is covered with a layer of electrophoretic protective film 2, while the yoke 11 of the stator core units 1 is not covered with the electrophoretic protective film 2, so that the external dimensions of the yoke 11 of the stator core units 1 are not changed. This can effectively prevent the size deviation of the annular stator core after the strip stator core is rolled, effectively improve the qualification rate of the stator core, reduce the material scrap rate, and thus reduce the manufacturing cost of the motor.

The tooth part 12 comprises a crown 121 and a root 122; and the crown 121 and a part of the root 122 connected to the crown 121 are coated with the electrophoretic protective film 2. Specifically, a boundary line L between the electrophoretic protective film 2 and the root 122 is the middle line of the root 122. This ensures the anti-corrosion protection effect for the stator core, and the reasonable layout of the area of the electrophoretic protection film 2 improves the electrophoretic efficiency, saves processing time of the strip stator core, and reduces processing costs.

Each of the plurality of stator core units 1 comprises a plurality of silicon steel laminates. The processing technology of the silicon steel laminates is mature and the manufacturing cost is low.

The yokes 11 of every two adjacent stator core units 1 are connected through a connecting bar 3; and the connecting bar is located on one end of the yoke 11 away from the tooth part 12. A first groove 4 is disposed on a first side of the connecting bar 3 and between two yokes of two adjacent stator core units 1; a second groove 5 is disposed on a second side of the connecting bar 3 and between the two yokes of the two adjacent stator core units 1; and the first groove 4 and the second groove 5 are both arc-shaped.

The yoke of a head of the plurality of stator core units 1 comprises a male buckle 111, the yoke of a tail of the plurality of stator core units 1 comprises a female buckle 112 matched with the male buckle.

After the strip stator core is rolled into a circular shape, the male buckle 111 on the head stator core unit 1 is embedded in the female buckle 112 on the tail stator core unit 1, maintaining the shape of the circular stator core. The structure is simple and reliable, easy to install.

The yoke 11 of a part of the plurality of stator core units 1 comprises a screw hole 113, thus facilitating the strip stator core to be installed on a motor.

The disclosure also provides a stator assembly, comprising an end insulation, a coil winding, and the abovementioned strip stator core.

The disclosure further provides a motor, comprising the abovementioned stator assembly, a rotor assembly, and a housing.

It will be obvious to those skilled in the art that changes and modifications may be made, and therefore, the aim in the appended claims is to cover all such changes and modifications.

What is claimed is:

1. A strip stator core, comprising:

a plurality of interconnected stator core units, each of the plurality of stator core units comprising a yoke and a tooth part protruding from an inner side or an outer side of the yoke; the tooth part comprising a crown and a root;

wherein:

the root comprises a first part connected to the crown and a second part connected to the yoke;

the tooth part comprises an outer surface partially covered with an electrophoretic protective film; wherein the crown and the first part of the root are coated with the electrophoretic protective film, while the yoke and the second part of the root are free of the electrophoretic protective film; and yokes of the plurality of interconnected stator core units are coiled to form a ring.

2. The strip stator core of claim 1, wherein a boundary line L between the electrophoretic protective film and the root is a middle line of the root.

3. The strip stator core of claim 2, wherein each of the plurality of stator core units comprises a plurality of silicon steel laminates.

4. The strip stator core of claim 3, wherein two yokes of every two adjacent stator core units are connected through a connecting bar; and the connecting bar is located on one end of the yoke away from the tooth part.

5. The strip stator core of claim 4, wherein a first groove is disposed on a first side of the connecting bar and between two yokes of two adjacent stator core units; a second groove is disposed on a second side of the connecting bar and between the two yokes of the two adjacent stator core units; and the first groove and the second groove are both arc-shaped.

6. The strip stator core of claim 5, wherein the yoke of a head of the plurality of stator core units comprises a male buckle, the yoke of a tail of the plurality of stator core units comprises a female buckle matched with the male buckle.

7. The strip stator core of claim 6, wherein the yoke of a part of the plurality of stator core units comprises a screw hole.

8. A stator assembly, comprising an end insulation, a coil winding, and the strip stator core of claim 1.

9. A motor, comprising the stator assembly of claim 8, a rotor assembly, and a housing.

* * * * *